United States Patent
Heuer et al.

(10) Patent No.: US 9,290,590 B2
(45) Date of Patent: Mar. 22, 2016

(54) POLYMERIC ANTI-STATIC AGENT

(75) Inventors: Helmut Werner Heuer, Leverkusen (DE); Rolf Wehrmann, Krefeld (DE)

(73) Assignee: Bayer Intellectual Property GmbH (DE)

( * ) Notice: Subject to any disclaimer, the term of this patent is extended or adjusted under 35 U.S.C. 154(b) by 164 days.

(21) Appl. No.: 13/642,304

(22) PCT Filed: Apr. 20, 2011

(86) PCT No.: PCT/EP2011/056347
§ 371 (c)(1),
(2), (4) Date: Jan. 18, 2013

(87) PCT Pub. No.: WO2011/131728
PCT Pub. Date: Oct. 27, 2011

(65) Prior Publication Data
US 2013/0109809 A1     May 2, 2013

(30) Foreign Application Priority Data
Apr. 23, 2010   (DE) .................. 10 2010 018 235

(51) Int. Cl.
| C08L 69/00 | (2006.01) |
| C09K 3/00 | (2006.01) |
| C08F 126/04 | (2006.01) |
| C08F 126/06 | (2006.01) |
| C08L 39/04 | (2006.01) |

(52) U.S. Cl.
CPC ............... *C08F 126/06* (2013.01); *C08L 69/00* (2013.01); *C08L 39/04* (2013.01); *C08L 2201/04* (2013.01); *C08L 2310/00* (2013.01)

(58) Field of Classification Search
CPC ... C08F 126/06; C08L 69/00; C08L 2201/04; C08L 2310/00; C08L 39/04
USPC ................ 525/328.3, 340, 343, 353; 526/310
See application file for complete search history.

(56) References Cited

U.S. PATENT DOCUMENTS

| 3,288,770 | A | * | 11/1966 | Butler ............................ 526/204 |
| 4,081,341 | A | * | 3/1978 | Christenson et al. ......... 204/480 |
| 5,015,395 | A | * | 5/1991 | Muia et al. .................... 210/755 |
| 6,610,767 | B1 | | 8/2003 | Katayama et al. |
| 6,914,092 | B1 | | 7/2005 | Dobler et al. |
| 2003/0139503 | A1 | | 7/2003 | Dobler et al. |
| 2012/0125863 | A1 | * | 5/2012 | Guliashvili et al. .......... 210/735 |

FOREIGN PATENT DOCUMENTS

| EP | 0855420 | B1 | 3/2004 |
| EP | 1210388 | B2 | 3/2008 |
| EP | 1290106 | B1 | 8/2009 |
| JP | 05171570 | A1 * | 7/1993 |
| JP | 6228420 | A | 8/1994 |
| JP | 07300568 | A1 * | 11/1995 |
| JP | 2008255224 | A | 10/2008 |

OTHER PUBLICATIONS

Machine translation of JP2008-255224.*
International Search Report for PCT/EP2011/056347 mailed Jul. 15, 2011.
International Preliminary Report on Patentability dated Oct. 23, 2012.

* cited by examiner

*Primary Examiner* — Irina S Zemel
*Assistant Examiner* — Jeffrey Lenihan
(74) *Attorney, Agent, or Firm* — Drinker Biddle & Reath LLP

(57) ABSTRACT

The application relates to polymeric antistatic agents for use in polymer molding compositions, as well as molding compositions containing these antistatic agents, the antistatic agents having good compounding properties and being inexpensive to produce,
wherein the antistatic agent is an antistatic agent of the general formula (I)

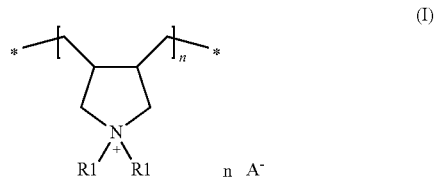

having a polymeric cationic polyelectrolyte constituent produced from diallyldialkylammonium compounds and an anionic counterion $A^-$, in which
R1 is uniformly or mutually independently $C_1$-$C_{18}$ alkyl,
$A^-$ is an acid anion, and
n is a whole number from 10 to 1000.

12 Claims, 1 Drawing Sheet

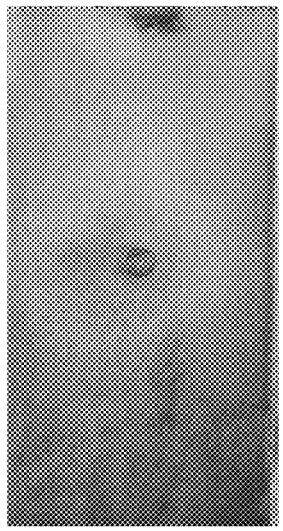 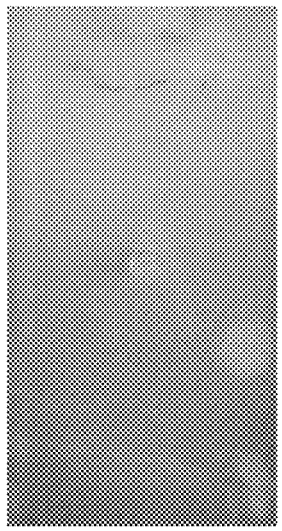 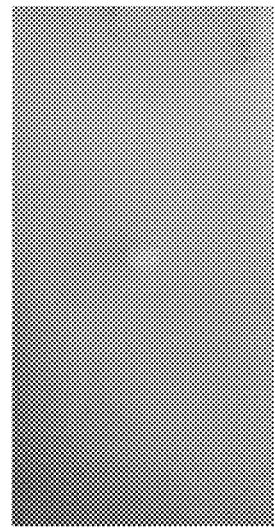
Comparative example 1      Example 1      Example 2

POLYMERIC ANTI-STATIC AGENT

CROSS-REFERENCE TO RELATED APPLICATIONS

This application is a national stage application (under 35 U.S.C. §371) of PCT/EP2011/056347, filed Apr. 20, 2011, which claims benefit of German Application No. 10 2010 018 235.4, filed Apr. 23, 2010, both of which are incorporated herein by reference in their entirety.

The application relates to polymeric antistatic agents for use in polymer moulding compositions, as well as moulding compositions containing these antistatic agents, the antistatic agents having good compounding properties and being inexpensive to produce.

The accumulation of dust with formation of dust figures is a widespread problem in plastic mouldings. See in this connection for example Saechtling, Kunststoff-Taschenbuch, 26th edition, Hanser Verlag, 1995, Munich, p. 140 f. Dust deposits on transparent mouldings are particularly troublesome and restrict their function. Such mouldings are used, for example, for applications in the field of optical data storage media, electrical engineering, automotive construction, in the building sector, for liquids containers or for other optical applications. Dust accumulation is undesirable for all these applications—particularly if the mouldings are also to be coated—and may impair their function.

One known method for reducing the accumulation of dust on plastic articles is to use antistatic agents. The literature describes antistatic agents for thermoplastics (see for example Gächter, Müller, Plastic Additives, Hanser Verlag, Munich, 1996, p. 749 ff) which restrict dust accumulation. These antistatic agents improve the electrical conductivity of the plastic moulding compositions and thus dissipate any surface charges which develop during production and use. Dust particles are thus less attracted and dust accumulation is consequently reduced.

A distinction is generally made between internal and external antistatic agents. An external antistatic agent is applied to the plastic moulding after processing, while an internal antistatic agent is added to the plastic moulding compositions as an additive. On economic grounds it is usually desirable to use internal antistatic agents, as no further operations for applying the antistatic agent are necessary after processing.

The internal antistatic agents described hitherto in the literature for thermoplastics, and especially for polycarbonates, mostly have one or more of the following disadvantages:
Reduce the molecular weight of the thermoplastic
Effective only in high concentrations (>0.5%)
Cause haze in transparent thermoplastics
Not sufficiently effective to allow electrostatic discharge after extrusion, for example, and thus to prevent dust accumulation
Cause discoloration, and
In particular, are a high cost factor One class of antistatic agents that is frequently described in thermoplastics is sulfonic acid salts. JP-A 06228420 for example describes aliphatic sulfonic acid ammonium salts as an antistatic agent in polycarbonate. However, these compounds bring about a reduction in molecular weight, as too do phosphonium salts.

Quaternary ammonium salts of perfluoroalkyl sulfonic acids and also their use as antistatic agents in thermoplastics are known, as described for example in EP 1 290 106 B1 and EP 1 210 388 B1.

The disadvantage of these compounds, however, lies firstly in their high price and secondly in the often inadequate thermal stability of the compounds during processing, which leads to degradation products that are extremely damaging to polycarbonates in particular.

The object of the invention is therefore the provision of novel antistatic agents that are inexpensive to produce and that do not negatively influence the material properties of plastics, as well as the use of these antistatic agents to produce thermoplastic compositions and the provision of these compositions.

Surprisingly it was found that oligomeric or polymeric salts based on diallyldialkylammonium chloride, in particular on diallyldimethylammonium chloride (DADMAC), can be produced easily and cost effectively and offer excellent antistatic properties combined with good thermal stability.

The present invention therefore provides antistatic agents based on oligomeric or polymeric salts having polydiallyldialkylammonium compounds as polycations and acid anions, the method for their production, as well as thermoplastic compositions produced with these compounds and the use of these compounds to produce thermoplastic compositions.

The antistatic agents according to the invention have a structure according to formula (I)

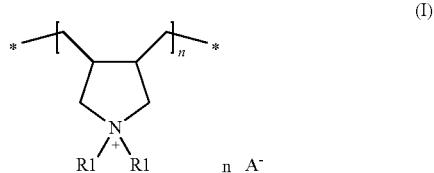

having a polymeric cationic electrolyte constituent produced from diallyldialkylammonium compounds and anionic counterions ($A^-$), in which R1 is uniformly or mutually independently $C_1$-$C_{18}$ alkyl, preferably methyl, ethyl, propyl, isopropyl, butyl, sec-butyl, tert-butyl, pentyl, neopentyl, hexyl, cyclohexyl or thexyl and particularly preferably methyl,
and
$A^-$ is an acid anion, and
n is a whole number from 10 to 1000.

Owing to a possibly incomplete polymer-analogous reaction the anion $A^-$ may also contain a proportion of non-exchanged anions such as hydroxyl or chloride ions. This proportion is preferably less than 10%, more preferably less than 5% and particularly preferably less than 1%, 0% being understood to be the lower limit in each case.

The acid anion $A^-$ is preferably selected from the group comprising inorganic acid anions and organic acid anions, in particular sulfonic acid anions and halogenated sulfonic acid anions.

In one embodiment the acid anion $A^-$ can be derived from only one acid or from a mixture of a plurality of acids, such that various anions are present in the polyelectrolyte.

$A^-$ is preferably a sulfonic acid anion and A is more preferably a sulfonic acid anion according to formula (II)

in which R2 is selected from the group comprising $C_1$-$C_{18}$ alkyl, mono- or polyfluorinated or perfluorinated $C_1$-$C_{18}$ alkyl, $C_2$-$C_8$ alkyl ethers, wherein the alkyl chain contains at least one ether function and the carbon atoms can optionally be wholly or partially halogenated, aryl sulfonates, perfluorinated aryl sulfonates, aryl-substituted alkyl sulfonates and aryl-substituted perfluoroalkyl sulfonates.

In a preferred embodiment R2 is a $C_2$-$C_8$ alkyl or perfluoroalkyl.

In a further preferred embodiment R2 is selected from the group comprising

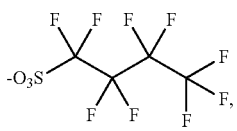

(IIIa)

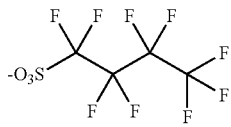

(IIIe)

The application also provides a method for preparing the antistatic agents according to the invention, comprising the following steps:
   Exchange of the anion of the cationic polyelectrolyte constituent for hydroxyl ions,
   Neutralisation of the modified polyelectrolyte constituent with the acid of component A,
   Washing and drying of the precipitated antistatic agent.

These steps are illustrated by way of example in the following reaction scheme:

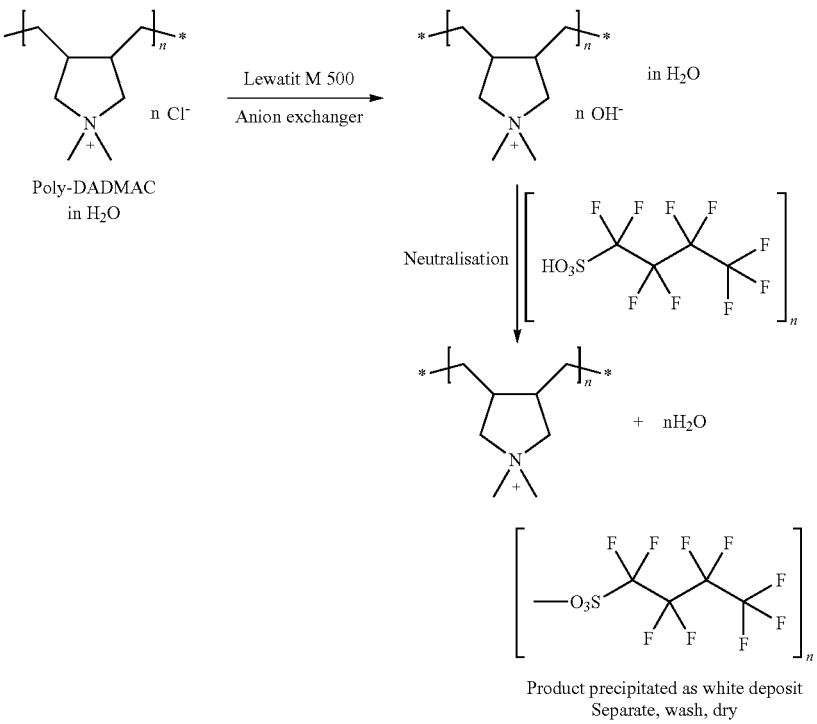

-continued

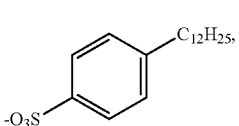

(IIIb)

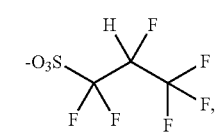

(IIIc)

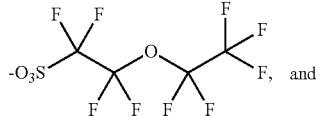

(IIId)

The present invention also relates to thermoplastic moulding compositions containing:
   At least one thermoplastic and
   At least one antistatic agent according to formula (I) with R1, A and n as specified above, and
   Optionally further conventionally used polymer additives.

The antistatic agents are preferably added to the thermoplastics in amounts from 0.05 to 5.00 wt. %, preferably from 0.1 to 2.5 wt. % and particularly preferably from 0.2 wt. % to 1.5 wt. %, relative to the total composition.

Suitable thermoplastics within the meaning of the invention are understood to be in particular but not necessarily transparent thermoplastics, preferably the polymers of ethylenically unsaturated monomers and/or polycondensates of bifunctional reactive compounds, and blends of these thermoplastic components.

Particularly suitable plastics are polycarbonates or copolycarbonates based on diphenols, poly- or copolyacrylates and poly- or copolymethacrylates such as for example and preferably polymethyl methacrylate, polymers or copolymers with styrene such as for example and preferably transparent polystyrene or polystyrene acrylonitrile (SAN), transparent thermoplastic polyurethanes, and polyolefins such as for example and preferably transparent polypropylene types or polyolefins based on cyclic olefins (e.g. TOPAS®, TOPAS Advanced Polymers), poly- or copolycondensates of terephthalic acid such as for example and preferably poly- or copolyethylene terephthalate (PET or CoPET) or glycol-modified PET (PETG) or cyclobutanediol-modified PET (e.g. Tritan®—Types of Eastman Chemicals) and possible blends thereof.

Blends are preferably PC/ABS, PC/ASA, PC/PBT and PC/PET.

Polycarbonates or copolycarbonates, in particular non-halogenated polycarbonates and/or copolycarbonates, having molecular weights $M_w$ from 500 to 100,000, preferably from 10,000 to 50,000, particularly preferably from 15,000 to 40,000, are preferred in particular.

Thermoplastic, aromatic polycarbonates within the meaning of the present invention are both homopolycarbonates and copolycarbonates; the polycarbonates can be linear or branched in a known manner.

These polycarbonates are produced in a known manner from diphenols, carbonic acid derivatives, optionally chain terminators and optionally branching agents.

Details of the production of polycarbonates have been set out in many patent specifications over the last 40 years or so. By way of example reference is made here only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second Edition, 1988, pages 648-718, and finally to Drs. U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

The polycarbonates can be produced both in the melt and in solution.

The following diphenols are preferred for polycarbonate production:

4,4'-Dihydroxydiphenyl, 2,2-bis-(4-hydroxyphenyl)propane (BPA), 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)propane and 1,1-bis-(4-hydroxyphenyl)-3,3,5-trimethylcyclohexane (TMC), 2,2-bis-(3-methyl-4-hydroxyphenyl)propane, 2-methyl-3,3-bis-(4-hydroxyphenyl)phthalimidine, 3,3-bis-(4-hydroxyphenyl)-1-phenyl-1H-indol-2-one, 2,2-bis-(4-hydroxyphenyl)-1-phenyl-1H-indol-3-one.

Particularly preferred diphenols are 2,2-bis-(4-hydroxyphenyl)propane (BPA), 2,2-bis-(3-methyl-4-hydroxyphenyl)propane, 1,1-bis-(4-hydroxyphenyl)cyclohexane and 1,1-bis-(4-hydroxyphenyl)-3,3,5-trimethylcyclohexane (TMC), 4,4'-dihydroxydiphenyl (DOD), 2-methyl-3,3-bis-(4-hydroxyphenyl)phthalimidine, 3,3-bis-(4-hydroxyphenyl)-1-phenyl-1H-indol-2-one, 2,2-bis-(4-hydroxyphenyl)-1-phenyl-1H-indol-3-one.

Preferred branching agents are triphenols such as for example 1,1,1-tris-(4-hydroxyphenylethane) (THPE), trimesic acid (trichloride), cyanuric acid trichloride and 3,3-bis-(3-methyl-4-hydroxyphenyl)-2-oxo-2,3-dihydroindole (IBK).

In order to achieve improved plastic compositions it is possible within the meaning of the invention for at least one further additive that is conventionally present in thermoplastics, preferably poly- and copolycarbonates, additionally to be present.

The release agents that are optionally added to the compositions according to the invention are preferably selected from the group comprising pentaerythritol tetrastearate and glycerol monostearate as well as carbonates of partial esters of these compounds (for example glycerol monostearate carbonate), stearyl stearate and propanediol stearate as well as mixtures thereof.

In a preferred embodiment the esterified unsaturated fatty acids can also be wholly or partially epoxidised.

The release agents are used in amounts from 0.05 wt. % to 2.00 wt. %, relative to the moulding composition, preferably in amounts from 0.1 wt. % to 1.0 wt. %, particularly preferably in amounts from 0.15 wt. % to 0.60 wt. % and most particularly preferably in amounts from 0.2 wt. % to 0.5 wt. %, relative to the total composition.

Sterically hindered phenols (for example Irganox types from Ciba, for example Irganox 1076 (octadecyl-3-(3,5-di-tert-butyl-4-hydroxyphenyl)propionate), Irganox 1010 (pentaerythritol tetrakis(3-(3,5-di-tert-butyl-4-hydroxyphenyl)propionate) or Irganox 1035 (thiodiethylene bis-(3-(3,5-di-tert-butyl-4-hydroxyphenyl)propionate)) are preferably used as primary antioxidants.

Thermal stabilisers that are optionally added are selected from the group comprising Triphenylphosphine (TPP),
PEPQ: Irgafos P PEPQ; dimeric phosphonite from BASF/Ciba (CAS no. 119345-01-6),
Irgafos® 168: BASF (CAS no. 31570-04-4),
Irganox® B900: mixture of Irgafos 168 and Irganox 1076 (sterically hindered phenol/CAS no. 2082-79-3) in the ratio 4:1 from BASF, and
Doverphos S 9228-PC: Dover, USA (CAS no. 154862-43-8).

The compositions according to the invention can furthermore contain conventional additives such as other thermal stabilisers, antistatic agents, colouring agents, flow control agents and flame retardants.

Organic, phosphorus-containing flame retardants such as bisphenol A diphosphate, halogenated flame retardants such as tetrabromobisphenol A oligocarbonate, alkali and alkaline-earth salts of aliphatic and aromatic sulfonic acid, sulfonamide and sulfonimide derivatives are preferred in particular as optional flame retardants.

UV absorbers are selected by way of example and preferably from the group of hydroxybenzotriazoles and hydroxytriazines.

Fillers, foaming agents, dyes, pigments, optical brighteners, interesterification catalysts and nucleating agents can moreover optionally be added to the compositions.

The total amount of additives in the compositions is preferably 0.01 to 15.00 wt. %, more preferably 0.05 to 10.00 wt. % and particularly preferably 0.10 to 5.00 wt. %, relative to the total weight of the composition.

Incorporation of the antistatic agents according to the invention and optionally of the additives or mixtures of additives takes place in the generally conventional manner, for example before or during polymerisation or by subsequent mixing with the thermoplastic.

The plastic compositions thus obtained are generally in the form of solutions, dispersions, emulsions, dusts, powders, pellets, platelets or flakes (moulding compositions) and are used to produce moulded objects (mouldings).

Moulded objects are for example and preferably translucent objects such as for example and preferably light diffusers for motor vehicles, plastic covers for lighting elements and headlamps, lenses such as for example spectacle lenses, films, tapes, sheets, ribbed sheets, multi-wall sheets, vessels, pipes and other profiles produced by the conventional methods, such as for example hot press moulding, spinning, extrusion or injection moulding. The polymer compositions can also be processed into cast films.

The use of the plastic composition according to the invention to produce multilayer systems and laminates is also of interest. In such cases the plastic composition according to the invention is applied in a thin layer in the form of a masterbatch to a moulded object made from a plastic that has not been provided with antistatic agents. Application can take place simultaneously with or immediately after shaping of the moulding, for example by coextrusion or sandwich injection moulding. Application can, however, also be performed onto the pre-shaped substrate, for example by lamination with a film or by coating with a solution.

The plastic compositions containing the antistatic agents according to the invention are preferably used for the production of light diffusers for motor vehicles and plastic covers for lighting elements and headlamps.

The use of the plastic compositions containing the antistatic agents according to the invention for the production of sheets, twin-wall sheets, coextruded sheets and films is also of particular interest. Also of interest is the use of the antistatic agents according to the invention in flame-retardant thermoplastic moulding compositions.

The advantage of the plastic mouldings provided with the antistatic agents according to the invention is that they no longer develop an electrostatic charge, for example during production, when the conventionally used protective films are peeled off or during transport and storage.

The antistatic agents according to the invention are particularly suitable for transparent formulations of the thermoplastics, but opaque formulations can also be provided with antistatic properties with the aid of these additives.

The examples below serve to illustrate the invention. The invention is not limited to the examples. The percentages stated below are percentages by weight.

EXAMPLES

Dust Test

In order to investigate dust accumulation in a laboratory test, the injection moulded sheets are exposed to an atmosphere containing a suspended dust. To this end, a 2-liter breaker containing an 80-mm-long magnetic stirrer rod of a triangular cross-section is filled to a depth of approx. 1 cm with dust (coal dust/20 g activated carbon, Riedel de Haen, Seelze, Germany, item no. 18003). The dust is suspended in the atmosphere with a magnetic stirrer. Once the stirrer has been stopped, the test specimen is exposed to this dusty atmosphere for 10 seconds. Depending upon the test specimen used, a greater or lesser amount of dust is deposited on the test specimens.

Evaluation of dust accumulations (dust figures) is performed visually. Sheets exhibiting dust figures were rated negatively (−), while sheets that were virtually free from dust figures were rated (+).

Raw Materials Used:

PC 1 is a polycarbonate based on bisphenol A and phosgene with a solution viscosity of 1.26.

The solution viscosity was determined in a polycarbonate solution consisting of 0.5 g of polymer/liter in methylene chloride, at 25° C., using an Ubbelohde viscometer.

The antistatic agent was produced in accordance with the procedure below.

PolyDADMAC (abbreviation for polydiallyldimethylammonium chloride, see structure (IV), CAS no. 26062-79-3) is a polyelectrolyte in aqueous solution that is commercially available.

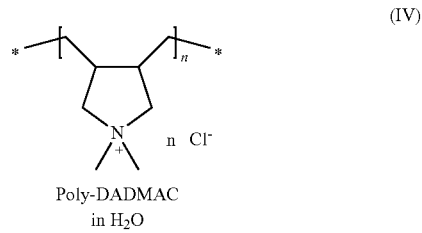

Poly-DADMAC
in H$_2$O (IV)

150 g of an aqueous polyDADMAC solution (Aldrich, 35% in water, M$_w$<100,000 g/mol, with a viscosity of 100-200 cP) was treated repeatedly using a Lewatit® M 500 ion exchanger. The ion exchanger was first regenerated with sodium hydroxide solution and washed with distilled water until neutral.

The dilute solution of the polyelectrolyte was concentrated to small volume in a rotary evaporator. A slightly yellowish, crystalline product remained.

75 g of nonafluorobutane-1-sulfonic acid (97%, Aldrich) were dissolved in 350 ml of distilled water.

After being concentrated to small volume by evaporation following ion exchange, the polyelectrolyte was dissolved again in 200 ml of distilled water. The initial pH was 12.7.

Titration was then performed to the neutral point of pH 7 (acid-base reaction) with the acid solution of nonafluorobutane-1-sulfonic acid. 230 ml of the acid solution were consumed in this process. A whitish, very fine product was precipitated during neutralisation. This fine suspension was siphoned off and washed repeatedly with distilled water. The product thus obtained was then dried in a drying oven at 100° C. under vacuum.

Yield: 51.7 g of a white solid.

Production of Test Specimens

In order to produce the test specimens, polycarbonate PC1 was at 280° C. in a twin-screw extruder with the amount of sulfonic acid salts specified in Table 1 (according to Example 1 and 2 and the comparative example) (Table 1) mixed/compoundet.

Rectangular sheets (155 mm×75 mm×2 mm) were then injection moulded from these pellets at a melt temperature of 300° C.

The rectangular sheets were then subjected to the dust test. The results are set out in Table 1 and illustrated in FIG. I.

BRIEF DESCRIPTION OF THE DRAWING

FIG. 1 shows the results of dust test, as noted above.

TABLE 1

| Plastic compositions and dust test | | | | |
|---|---|---|---|---|
| Results: | | Comparison 1 | Ex. 1 | Ex. 2 |
| Content of antistatic agents | wt. % | — | 0.25 | 0.75 |
| Polycarbonate | wt. % | 100 | 99.75 | 99.25 |
| Dust test evaluation | | — | + | + |

It can clearly be seen that the comparative example with no additive still attracts significant amounts of carbon black in comparison to the examples according to the invention. The sample containing just 0.25 wt. % of the antistatic additive from Example 1 exhibits virtually no coating with carbon black. The antistatic agents according to the invention thus have good antistatic properties. They are easy and inexpensive to produce, and thermally stable and give rise to no additional yellowing of the compositions.

The invention claimed is:

1. A thermoplastic composition comprising at least one polycarbonate and 0.1 to 2.5 wt. % of an antistatic agent of the general formula (I)

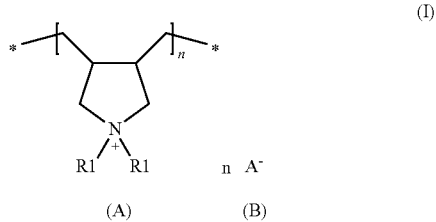

having a polymeric cationic polyelectrolyte constituent (A) produced from diallyldialkylammonium compounds and an anionic counterion $A^-$ (B), in which
R1 is uniformly or mutually independently $C_1$-$C_{18}$ alkyl,
$A^-$ is a sulfonic acid anion according to formula (II),

in which R2 is selected from the group consisting of $C_1$-$C_{18}$ alkyl, mono- or polyfluorinated $C_1$-$C_{18}$ alkyl, perfluorinated alkyl, aryl sulfonates, perfluorinated aryl sulfonates, aryl-substituted alkyl sulfonates and aryl-substituted perfluoroalkyl sulfonates, and
n is a whole number from 10 to 1000.

2. The thermoplastic composition according to claim 1, characterised in that R1 is uniformly or mutually independently selected from the group consisting of methyl, ethyl, propyl, isopropyl, butyl, sec-butyl, tert-butyl, pentyl, neopentyl, hexyl, cyclohexyl and thexyl.

3. The thermoplastic composition according to claim 1, characterised in that $A^-$ is a perfluorobutane sulfonate.

4. A method for the antistatic treatment of thermoplastic compositions comprising utilizing the thermoplastic composition according to claim 3.

5. A method for producing moldings comprising utilizing the thermoplastic composition according to claim 1.

6. A plastic moulding comprising the thermoplastic composition according to claim 1.

7. The thermoplastic composition according to claim 1, Wherein the antistatic agent is present in an amount from 0.2 to 1.5 wt. % based on the composition.

8. The thermoplastic composition according to claim 1, wherein the antistatic agent consists of the antistatic agent of formula (I).

9. The thermoplastic composition according to claim 1, wherein R2 is selected from the group consisting of $C_1$-$C_{18}$ alkyl, mono- or polyfluorinated $C_1$-$C_{18}$ alkyl, perfluorinated aryl sulfonates, aryl-substituted alkyl sulfonates and aryl-substituted perfluoroalkyl sulfonates.

10. The thermoplastic composition according to claim 1, wherein the composition consists of the at least one polycarbonate, the antistatic agent, and optionally at least one additive selected from the group consisting of release agents, antioxidants, thermal stabilisers, coloring agents, flow control agents, flame retardants, UV absorbers, foaming agents, dyes, pigments, optical brighteners, interesterification catalysts, nucleating agents, and combinations thereof.

11. A method for producing a moulding having an antistatic effect, the moulding comprising the thermoplastic composition according to claim 1, the method comprising the following steps:
a) producing the antistatic agent by a process comprising
exchange of the anion of the cationic polyelectrolyte constituent for hydroxyl ions,
neutralisation of the modified polyelectrolyte constituent with the acid of component A,
washing and drying of the precipitated antistatic agent,
b) compounding of the antistatic agent with a thermoplastic polymer,
c) producing the moulding by injection moulding or extrusion.

12. A thermoplastic composition consisting of at least one thermoplastic; 0.1 to 2.5 wt. % of an antistatic agent of the general formula (I)

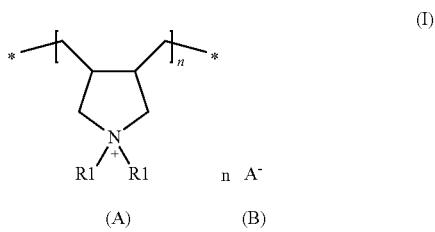

having a polymeric cationic polyelectrolyte constituent (A) produced from diallyldialkylammonium compounds and an anionic counterion $A^-$(B), in which
R1 is uniformly or mutually independently $C_1$-$C_{18}$ alkyl,
$A^-$ is a sulfonic acid anion according to formula (II),

in which R2 is selected from the group consisting of $C_1$-$C_{18}$ alkyl, mono- or polyfluorinated $C_1$-$C_{18}$ alkyl, perfluorinated $C_1$-$C_{18}$ alkyl, aryl sulfonates, perfluorinated aryl sulfonates, aryl-substituted alkyl sulfonates and aryl-substituted perfluoroalkyl sulfonates, and n is a whole number from 10 to 1000; and optionally at least one additive selected from the group consisting of release agents, antioxidants, thermal stabilisers, antistatic agents, coloring agents, flow control agents, flame retardants, UV absorbers, foaming agents, dyes, pigments, optical brighteners, interesterification catalysts, nucleating agents, and combinations thereof.

* * * * *